(12) United States Patent
Hung et al.

(10) Patent No.: US 10,785,384 B2
(45) Date of Patent: Sep. 22, 2020

(54) SUBMERSIBLE ELECTRONIC DEVICES WITH IMAGING CAPABILITIES

(71) Applicant: Apple Inc., Cupertino, CA (US)

(72) Inventors: Po-Chieh Hung, Sunnyvale, CA (US); Prashanth S. Holenarsipur, Fremont, CA (US); Serhan O. Isikman, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 69 days.

(21) Appl. No.: 15/717,733

(22) Filed: Sep. 27, 2017

(65) Prior Publication Data

US 2019/0098179 A1    Mar. 28, 2019

(51) Int. Cl.

| | |
|---|---|
| *H04N 5/225* | (2006.01) |
| *H04N 1/60* | (2006.01) |
| *H04N 5/58* | (2006.01) |
| *G03B 17/08* | (2006.01) |
| *H04N 5/232* | (2006.01) |
| *H04M 1/18* | (2006.01) |
| *H04N 9/73* | (2006.01) |
| *H04N 9/04* | (2006.01) |
| *H04M 1/725* | (2006.01) |

(52) U.S. Cl.
CPC ........... *H04N 1/6077* (2013.01); *G03B 17/08* (2013.01); *H04M 1/18* (2013.01); *H04N 5/2256* (2013.01); *H04N 5/23293* (2013.01); *H04N 5/58* (2013.01); *H04N 9/045* (2013.01); *H04N 9/735* (2013.01); *H04M 1/725* (2013.01); *H04M 1/72569* (2013.01); *H04M 2250/22* (2013.01); *H04M 2250/52* (2013.01)

(58) Field of Classification Search
CPC ............... H04N 1/6077; H04N 5/2256; H04N 5/23292; H04N 5/58
See application file for complete search history.

(56) References Cited

U.S. PATENT DOCUMENTS

| | | | | |
|---|---|---|---|---|
| 4,381,144 A | * | 4/1983 | Breslau | ..................... G02B 7/40 |
| | | | | 367/131 |
| 4,394,573 A | * | 7/1983 | Correa | ................... G01N 21/53 |
| | | | | 250/253 |
| 4,876,565 A | * | 10/1989 | Tusting | .................. G03B 17/08 |
| | | | | 396/101 |

(Continued)

*Primary Examiner* — Jonathan R Messmore
(74) *Attorney, Agent, or Firm* — Treyz Law Group, P.C.; G. Victor Treyz; David K. Cole

(57) ABSTRACT

A submersible electronic device such as a waterproof cellular telephone may be provided with an image sensor. The image sensor may capture images of underwater objects. Control circuitry in the submersible electronic device may adjust image contrast and color balance based on information from sensors and other information. The electronic device may have an ambient light sensor. The ambient light sensor may be a color ambient light sensor and may be used in measuring ambient lighting conditions above water and underwater. A depth sensor may be used in measuring the depth of the image sensor and other components of the electronic device underwater. Information on the depth of the image sensor, information on the distance of an underwater object to the image sensor, and angular orientation information for the electronic device and image sensor may be used in color balancing an image.

19 Claims, 9 Drawing Sheets

(56) References Cited

U.S. PATENT DOCUMENTS

| | | | | |
|---|---|---|---|---|
| 5,708,860 | A * | 1/1998 | Nonaka | G02B 7/32 |
| | | | | 396/28 |
| 5,826,113 | A * | 10/1998 | Nonaka | G02B 7/28 |
| | | | | 396/25 |
| 8,922,672 | B2 * | 12/2014 | Mahowald | H04N 5/23232 |
| | | | | 348/223.1 |
| 9,185,364 | B1 * | 11/2015 | Odierna | H04N 5/2256 |
| 2007/0016080 | A1 * | 1/2007 | Alfano | A61B 5/0066 |
| | | | | 600/476 |
| 2007/0237505 | A1 * | 10/2007 | Takita | G03B 7/16 |
| | | | | 396/25 |
| 2008/0043297 | A1 * | 2/2008 | Shiu | H04N 9/73 |
| | | | | 358/509 |
| 2010/0110268 | A1 * | 5/2010 | Akita | G03B 13/04 |
| | | | | 348/333.05 |
| 2011/0228075 | A1 * | 9/2011 | Madden | G03B 15/05 |
| | | | | 348/81 |
| 2012/0236173 | A1 * | 9/2012 | Telek | G03B 17/08 |
| | | | | 348/223.1 |
| 2014/0340570 | A1 * | 11/2014 | Meyers | H04N 5/211 |
| | | | | 348/370 |
| 2015/0177865 | A1 | 6/2015 | Rodzevski et al. | |
| 2016/0094824 | A1 | 3/2016 | Yang et al. | |
| 2017/0010691 | A1 | 1/2017 | Morobishi et al. | |
| 2018/0152217 | A1 * | 5/2018 | Laird | H04N 5/23245 |

\* cited by examiner

SUBMERSIBLE ELECTRONIC DEVICES WITH IMAGING CAPABILITIES

FIELD

This relates generally to electronic devices, and, more particularly, to electronic devices with image sensors.

BACKGROUND

Electronic devices are sometimes provided with image sensors. In a device such as a submersible camera, ambient light color is influenced by the presence of the water surrounding the camera. If care is not taken, images captured with a submersible camera may have an undesired greenish color cast.

SUMMARY

A submersible electronic device such as a waterproof cellular telephone may be provided with an image sensor. The image sensor may capture images of underwater objects. The spectral absorption of water tends to turn underwater ambient lighting conditions greenish. Control circuitry in the submersible electronic device can perform color balancing operations and take other actions to compensate for this change in ambient lighting.

Sensors such as an ambient light sensor, a depth sensor, a distance sensor, an orientation sensor, light-emitting and detecting devices, and other circuitry may be used in determining color balance adjustments and other image adjustments to make for underwater images.

The sensors may include a color ambient light sensor. The color ambient light sensor may be used in measuring ambient light spectra above water and under water. Information from the ambient light sensor may be used in determining a light absorption spectrum for water. The ambient light sensor may also be used in measuring ambient lighting conditions above water.

A depth sensor may be used in measuring the depth of the image sensor and other components of the electronic device when the electronic device is operated under water. Information on the depth of the image sensor, information on the distance of an underwater object to the image sensor, angular orientation information for the electronic device and image sensor, and/or other information may be used in color balancing an image. Water murkiness measurements and/or information on distance between the image sensor and an underwater object may be used in adjusting image contrast.

DETAILED DESCRIPTION

Figure 1:
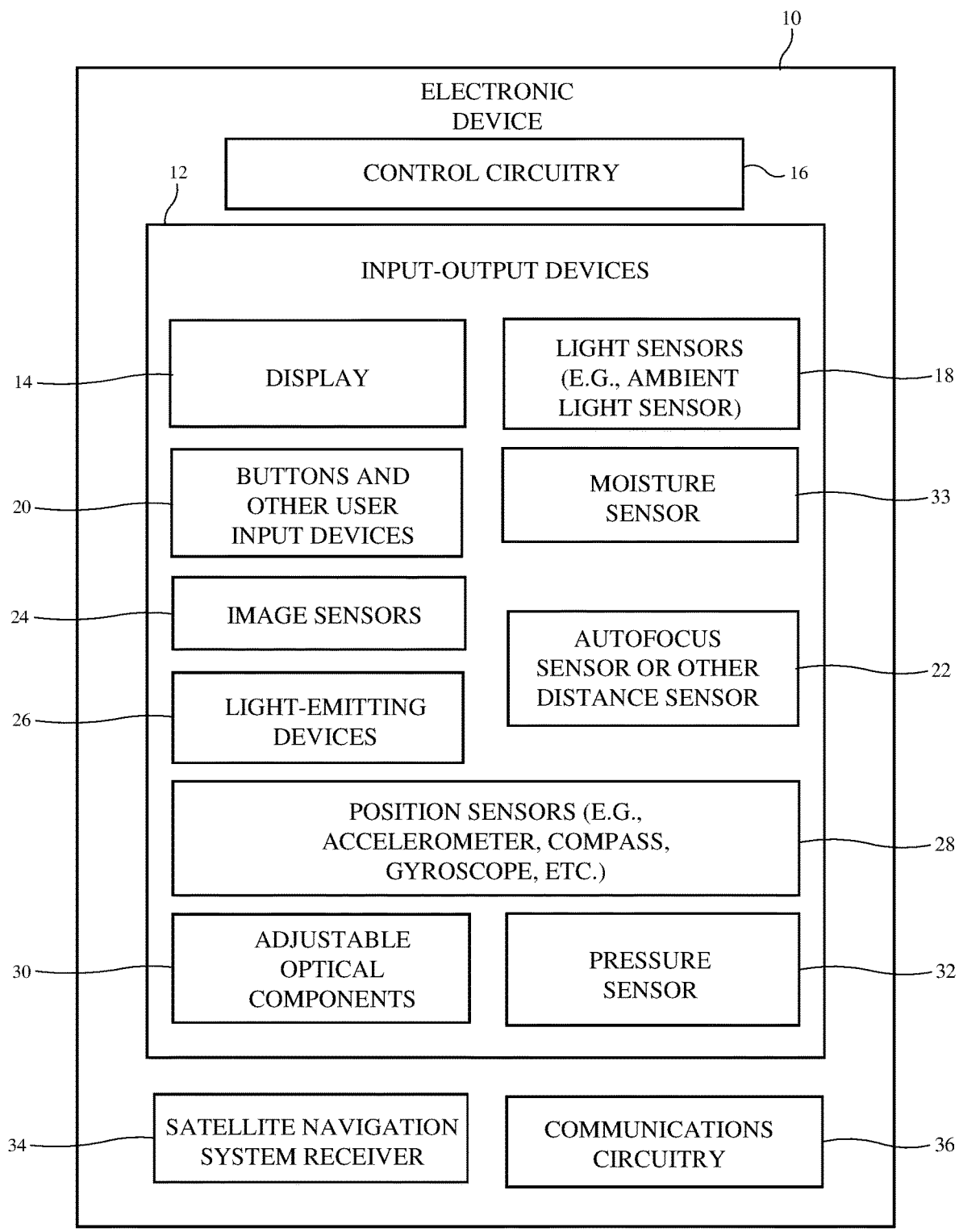
FIG. 1 is a schematic diagram of an illustrative electronic device having an image sensor in accordance with an embodiment.

A schematic diagram of an illustrative submersible electronic device with an image sensor is shown in FIG. 1. Electronic device 10, which may sometimes be referred to as an underwater device or waterproof device, may be sufficiently watertight to be used for capturing still and moving images of underwater scenes. Device 10 may, for example, be operable at depths of 0-20 m, 1-10 m, at least 5 m, at least 10 m, less than 50 m, or other suitable depths. Device 10 may be any suitable electronic device such as a camera, a cellular telephone, a media player, a tablet computer, or other handheld or portable electronic device, a smaller device such as a wrist-watch device, a pendant device, a headphone or earpiece device, a device embedded in eyeglasses or other equipment worn on a user's head, or other wearable or miniature device, a laptop computer, a digital camera, other electronic equipment, or a combination of devices such as these communicating with each other. Illustrative configurations in which device 10 is a cellular telephone may sometimes be described herein as an example.

As shown in FIG. 1, electronic device 10 may have control circuitry 16. Control circuitry 16 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, microcontrollers, digital signal processors, baseband processors, power management units, audio chips, application specific integrated circuits, etc.

Device 10 may have input-output circuitry such as input-output devices 12. Input-output devices 12 may include user input devices that gather user input such as buttons, touch sensors, force sensors, and other user input devices 20.

Devices 12 may also include components for providing a user with output (e.g., visual output, haptic output, sound, etc.). As an example, device 10 may include a display such as display 14 for displaying images for a user and may include light-emitting devices 26 for producing light. Display 14 may be a touch screen display that includes a touch sensor for gathering touch input from a user or display 14 may be insensitive to touch. A touch sensor for display 14 may be based on an array of capacitive touch sensor electrodes, acoustic touch sensor structures, resistive touch components, force-based touch sensor structures, a light-based touch sensor, or other suitable touch sensor arrangements. Display 14 may be a liquid crystal display, a light-emitting diode display (e.g., an organic light-emitting diode display), an electrophoretic display, or other display.

Light-emitting devices 26 may include light-emitting diodes, lasers, lamps, and other devices that produce visible and/or infrared light. Light-emitting devices 26 may, for example, include a camera flash (e.g., a white light-emitting diode) that is used in producing white light illumination during image capture operations. Colored light (e.g., red light or other visible light in a particular band of wavelengths) may be produced by a colored light source. If desired, light-emitting devices 26 may include a light-emitting diode or laser that produces infrared light (e.g., to illuminate a scene during infrared image capture operations). In some configurations, device 10 may include an optical proximity sensor. The optical proximity sensor may have a light-emitting device such as an infrared light-emitting diode and may have a corresponding light detector such as an infrared photodetector that is configured to detect corresponding reflected infrared light. Visible and/or infrared light-emitting diodes and/or lasers may also be used to emit light pulses while a light detector gathers reflections off of external objects. This type of arrangement may be used to form an optical range finder (e.g., a time-of-flight sensor).

In some arrangements, devices 12 may include autofocus sensors for a camera such as autofocus sensors 22. Autofocus sensors 22 measure the distance between device 10 and a target object so that device 10 can adjust a corresponding camera lens and thereby focus the lens on the target object. If desired, device 10 may have other components for measuring the distance between device 10 and external objects (e.g., three-dimensional gesture sensors that measure distance using triangulating image sensor or other optical sensors, echolocation sensors, time-of-flight sensors that measure the round trip time associated with a light pulse that is emitted by a light source in device 10, reflected from an external object, and that is measured by a photodetector in device 10, etc.). If desired, sensors 22 may include a multiple-lens or plenoptic (light-field) camera to measure the distance.

Image sensors 24 may include one or more visible light image sensors and/or one or more infrared image sensors. Image sensors 24 may capture still and/or moving images. Lenses (e.g., lenses associated with an autofocus system) may be used to focus light for image sensors 24. The lenses and image sensors may sometimes be referred to as forming visible light and/or infrared light cameras. If desired, adjustable optical components 30 (e.g., electrically adjustable spectral filters and/or other adjustable components) may be incorporated into device 10 (e.g., by overlapping an electrically adjustable filter over an image sensor, etc.).

Light-emitting devices 26 may include light-emitting diodes, lasers, and/or other sources of illumination that help correct the color of images acquired under water. For example, device 10 may have a red light source such as a red light-emitting diode or laser that is used to help illuminate objects underwater. In underwater conditions, red ambient light levels are relatively low, so providing supplemental red illumination may help achieve a desired color balance or a desired signal-to-noise ratio for each channel.

Light sensors 18 may include sensors for sensing the intensity and/or color of ambient light. As an example, light sensors 18 may include multichannel sensors such as color ambient light sensors where each channel is sensitive to a different respective color of light. A color ambient light sensor may, for example, include multiple photodetectors (e.g., 4-10, at least 3, at least 4, at least 8, at least 12, fewer than 40, fewer than 20, or other suitable number) each of which is overlapped by a color filter element (band pass filter) of a different respective color. This allows the color ambient light sensor to make ambient light color measurements and gather spectral information.

If desired, device 10 may include position sensors 28. Sensors 28 may include accelerometers for measuring the angular orientation of device 10 (e.g., the orientation of device 10 to the Earth), may include gyroscopes for making angular orientation measurements, and/or may include compasses or other magnetic sensors for measuring orientation. Sensors such as these may sometimes be packaged together to form inertial measurement units.

Pressure sensor 32 may be used to measure water pressure. Based on this water pressure reading, control circuitry 16 can determine the depth underwater of device 10. Pressure sensor 32 (and/or moisture sensor 33) may also be used to determine when device 10 is underwater (e.g., by measuring an increase in pressure and/or by measuring moisture).

Control circuitry 16 can use communications circuitry 36 to form communications links with other electrical equipment. Communications circuitry 36 may include wireless communications circuitry such as radio-frequency transceiver circuitry (e.g., cellular telephone transceiver circuitry, wireless local area network transceiver circuitry, etc.) and antennas for supporting cellular telephone communications, wireless local area network communications, near field communications, etc. Satellite navigation system receiver 34 (e.g., a Global Positioning System receiver) may be used in measuring the location of device 10 (e.g., the geographic location of device 10). The geographic location of device 10 may also be determined by monitoring which cellular base stations are in range of device 10, by monitoring which wireless local area networks are in range of device 10, etc.

Figure 2:
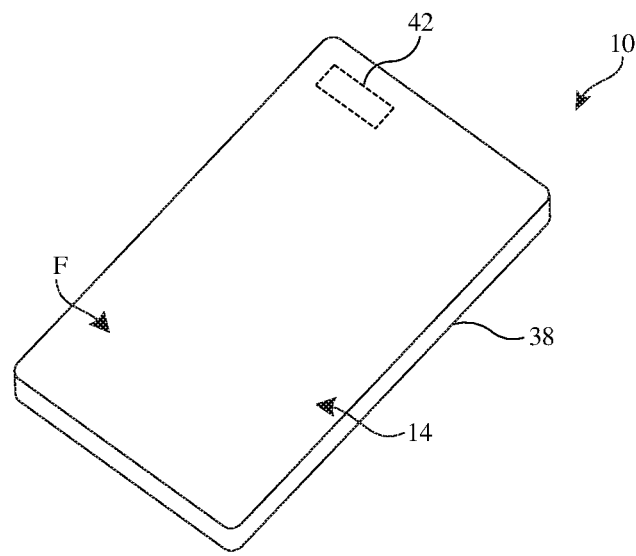
FIG. 2 is a front perspective view of an illustrative electronic device with an image sensor in accordance with an embodiment.
Figure 3:
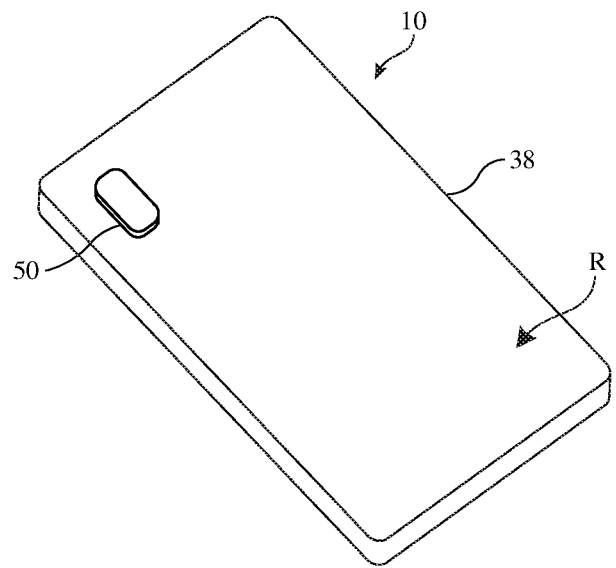
FIG. 3 is a rear perspective view of an illustrative electronic device with an image sensor in accordance with an embodiment.

FIGS. 2 and 3 are, respectively, front and rear perspective views of an illustrative electronic device. As shown in FIG. 2, device 10 may have a housing. Housing 38 may form a laptop computer enclosure, an enclosure for a wristwatch, a cellular telephone enclosure, a tablet computer enclosure, or other suitable device enclosure. In the example of FIG. 2, device 10 includes a display such as display 14 mounted on front face F of housing 38. Housing 38, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 38 may be formed using a unibody configuration in which some or all of housing 38 is machined or molded as a single structure or may be formed using multiple structures (e.g., an internal frame structure, one or more structures that form exterior housing surfaces, etc.). Housing 38 may have any suitable shape. In the example of FIG. 2, housing 38 has a rectangular outline (footprint when viewed from above) and has four peripheral edges (e.g., opposing upper and lower edges and opposing left and right edges). Sidewalls may run along the periphery of housing 38. Housing 38 may include gaskets and other sealing structures that prevent control circuitry 16 and other circuitry in the interior of housing 38 from being exposed to water when device 10 is being used underwater. Because housing 38 prevents water from intruding into the interior of device 10, device 10 may sometimes be referred to as an underwater device, submersible device, or waterproof device.

One or more optical components such as light sensors 18, display 14, image sensors 24, optical devices associated with sensor(s) 22, light-emitting devices 26, and/or optical components 30 may be mounted under windows or other structures (e.g., a display cover layer or other structure formed from glass, transparent polymer, sapphire or other crystalline material, etc.) that are transparent to visible and/or infrared light. As an example, display 14 may be mounted under a rectangular cover layer that covers some or all of front face F and optical components other than display 14 may be mounted under one or more windows such as region 42 of display 14 (e.g., an inactive area of display 14 that does not contain pixels for displaying images for a user). FIG. 3 shows how an optical window such as window 50 may be formed from a transparent member (e.g., glass, polymer, sapphire or other crystalline material, etc.) that is mounted within a rear housing wall (e.g., a portion of housing 38) on rear face R of device 10. Arrangements in which one or more optical components such as these operate through transparent portions of housing 38 (e.g., a rear housing wall or other housing wall made of glass, polymer, sapphire or other crystalline material, etc.) may also be used.

Digital cameras are sometimes provided with an automatic white balance function that estimates a satisfactory color correction to apply to captured images so that the apparent color of the images is pleasing to the eye (e.g., so that neutral image tones appear neutral to a viewer). Water tends to absorb red light, so that ambient light becomes greenish under water. This greenish ambient light deviates from the Planckian locus on which the chromaticity of usual light sources is located, so that conventional automatic white balance adjustments, which assume that light sources are on or near the Planckian locus, tend to produce unsatisfactory results (e.g., greenish underwater scenes are confused with green lawns or forest scenes and incorrect color balance adjustments are made). Here, color balance adjustments include white balance and color rendering for non-achromatic colors.

These shortcomings can be addressed by using the sensors and other data gathering capabilities of device 10 to characterize underwater ambient lighting conditions. Actions can then be taken based on the characterized underwater conditions. For example, color balance for still and/or moving images can be adjusted, compensating reddish illumination may be produced to help adjust the color of target objects in an underwater scene, a reddish filter may be switched into use, etc. The murkiness of water due to chemicals, plankton, and other materials can lead to undesired reductions in image contrast. In some arrangements, device 10 may use light backscattering measurements or other measurements to characterize the amount of murkiness that is present in an underwater environment. Appropriate action can then be taken based on the measured amount of murkiness and/or the distance between the image sensor of device 10 and the target object. For example, contrast can be enhanced to compensate for the loss of contrast in captured images due to murky water.

The color correction to be applied to an underwater image may be based on the distance that light travels from the surface of the water to a target illuminated object and then from the illuminated object to the surface of an image sensor in device 10 (i.e., the total distance that the imaged light travels in the water). Control circuitry 16 can dynamically determine how far light has traveled along this underwater path based on factors such as the depth of device 10, the angular orientation of device 10, and the distance between device 10 and the target object. For multiple objects in an image, appropriate correction may be applied for each object. Multiple flash lights having directivity can be used to appropriately compensate for the red light depending on the distance.

Figure 4:
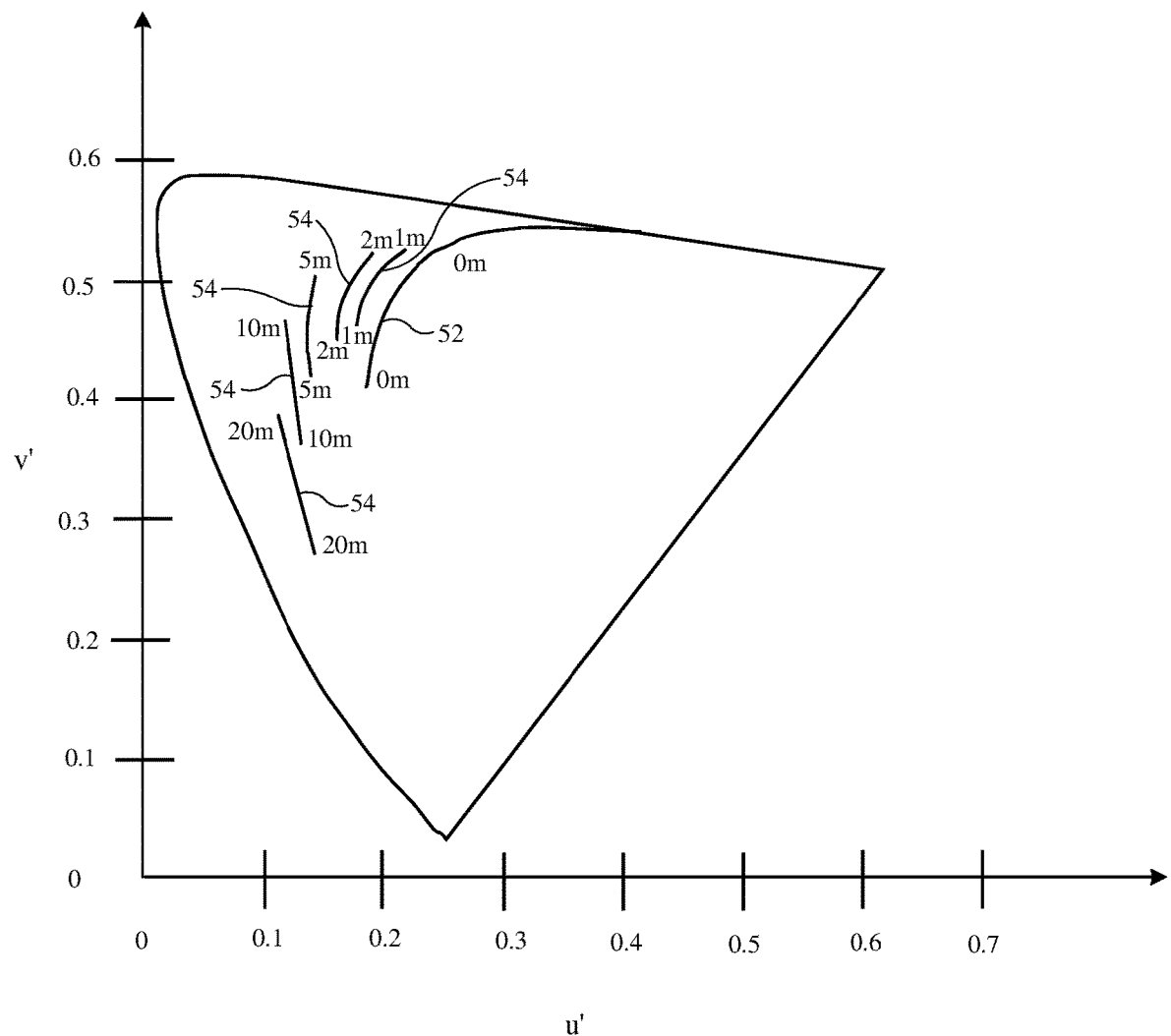
FIG. 4 is a chromaticity diagram showing illustrative Planckian Loci associated with different depths underwater in accordance with an embodiment.

FIG. 4 is a chromaticity diagram for illustrative above-water and underwater light sources. Curve 52 corresponds to the Planckian locus associated with typical above-water ambient lighting conditions. Curves 54 are Planckian loci corresponding respectively to ambient light at water depths of 1 m, 2 m, 5 m, 10 m, and 20 m. As these curves demonstrate, the white point of ambient light shifts toward green (cyan) and then moves toward blue at greater depths.

If desired, control circuitry 16 may adjust color balance in images captured using device 10 using ambient light white points selected using curves 54. Control circuitry 16 may gather a depth measurement using pressure sensor 32. The depth measurement may be used in selecting an appropriate underwater Planckian locus from curves 52. A depth-specific Planckian locus can be selected from curves 52 (e.g., using a nearest match to the measured depth) or interpolation techniques may be used to produce a depth-specific Planckian locus. The depth-specific Planckian locus can be used in estimating the white point of the ambient light and this estimated white point may be used in color balancing captured images.

If desired, the family of curves 54 can be used in estimating the depth of device 10. For example, a standard above-water illuminant (e.g., D65) or an above-water light spectrum measured by a color ambient light sensor in device 10 may be used in determining curve 52. Curves 54 can then be calculated or obtained from a look-up table. By measuring the underwater ambient light (e.g., using a color ambient light sensor) and comparing this underwater ambient light measurement to each of curves 54, a closest match curve can be retrieved and/or calculated using interpolation. The depth associated with the closest match can then be used by device 10 as a depth measurement indicating how far device 10 is located under the surface of the water.

Figure 5:
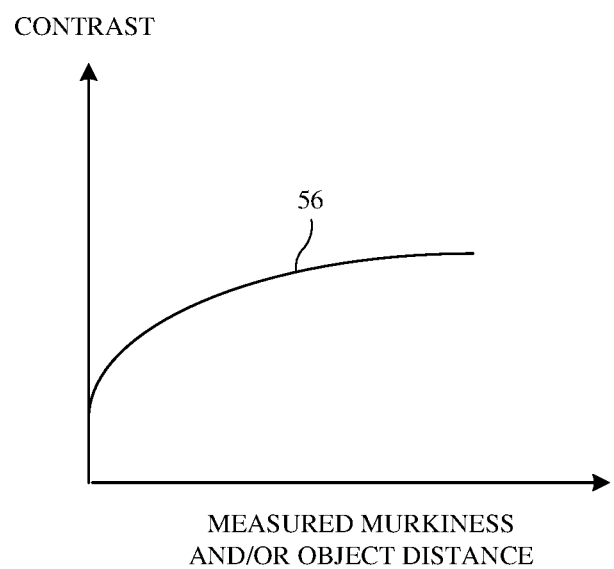
FIG. 5 is a diagram of illustrative contrast levels that may be established as a function of measured depth underwater and image-sensor-to-object distance in accordance with an embodiment.

Image contrast can be affected by water quality. Murky water tends to decrease contrast in captured images. During operation, control circuitry 16 can turn on one or more light-emitting devices 26 (e.g., control circuitry 16 can pulse a camera flash light-emitting diode and/or an infrared light-emitting diode one or more times to illuminate nearby murky water). The amount of backscattered light at visible and/or infrared wavelengths can be measured using light sensor 18 (e.g., one or more visible light and/or infrared photodetectors). If the murkiness of the water is high, the amount of light that is backscattered by the water surrounding device 10 will be high. If the murkiness of the water is low, less backscattered light will be measured. Once the murkiness of the water has been measured (and, if desired, the distance from the image sensor of device 10 to the object being imaged), the contrast of captured images can be adjusted to compensate. For example, the contrast of the image may be increased in accordance with a curve such as curve 56 of FIG. 5. Higher levels of water murkiness (for a given object distance) and higher levels of object distance (for a given water murkiness) decrease contrast in a captured image, so control circuitry 16 may, if desired, enhance contrast in response to increased levels of measured water murkiness and/or increased object distances to compensate.

Figure 6:
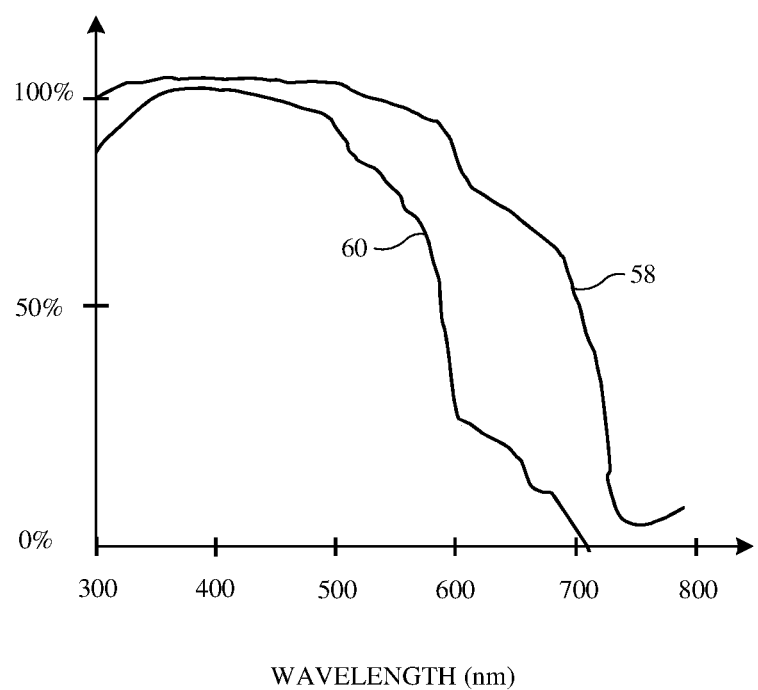
FIG. 6 is a graph of light transmission versus wavelength through different depths of water in accordance with an embodiment.

The spectrum of ambient light present under water changes as a function of depth, as illustrated by illustrative curves 58 and 60 of FIG. 6. Curve 58 may, for example, correspond to the light intensity as a function of wavelength (e.g., the transmission of light through water) when the water has a depth of 1 m, whereas curve 60 may correspond to the ambient light spectrum under 5 m of water. By determining the spectrum of absorbed light as a function of distanced through water, control circuitry 16 can compensate for color changes as ambient light follows a path from the surface of the water to a target object and then (as reflected light) follows a path from the target object to image sensor 24.

Figure 7:
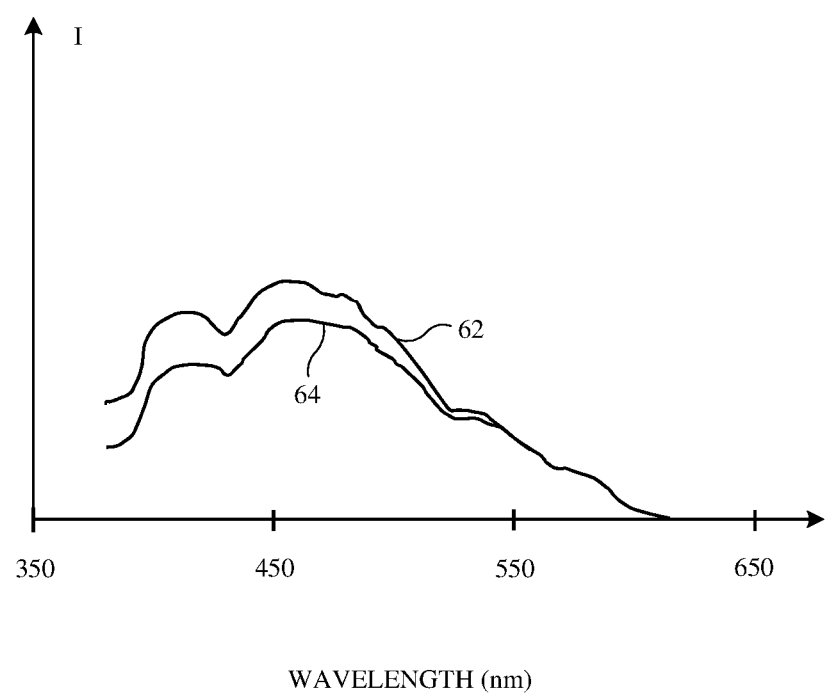
FIG. 7 is a graph of light intensity versus wavelength for two different illustrative outdoor lighting environments in accordance with an embodiment.

The spectrum of ambient light at the water's surface (e.g., the above-water ambient light spectrum) also has an influence on underwater lighting conditions. As shown in FIG. 7, for example, the amount of ambient light intensity I as a function of wavelength will be different under different types of above-water ambient light illumination. In the FIG. 7 example, the spectrum of ambient light at a depth under water of 10 m has been plotted for two different above-water ambient light illuminants. Curve 62 corresponds to cloudy above-water ambient lighting conditions (e.g., a D65 illuminant) and curve 64 corresponds to direct sun above-water ambient lighting conditions (e.g., a D55 illuminant). As the differences between the light spectrums of curves 62 and 64 demonstrate, different above-water lighting conditions will result in different underwater ambient lighting conditions. If desired, above-water ambient lighting conditions can be taken into account by control circuitry 16 in determining underwater ambient lighting conditions. For example, device 10 can use a color ambient light sensor to determine the above-water ambient light spectrum before device 10 is submersed in water. In some arrangements, a standard illuminant can be assumed to be present above the water.

Figure 8:
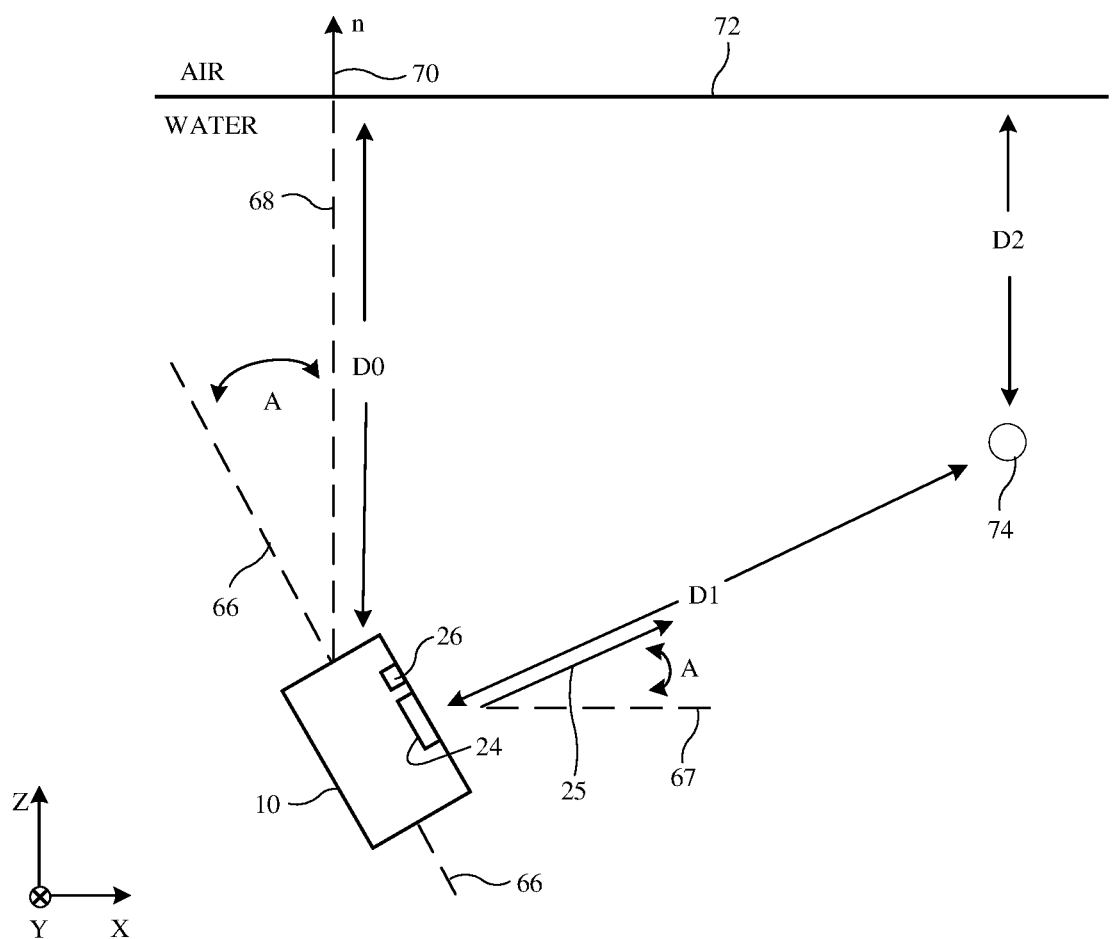
FIG. 8 is a diagram showing how an electronic device may be oriented relative to a underwater target object when capturing an underwater image of the target object in accordance with an embodiment.

FIG. 8 is a diagram showing how a geometrical model may be used in assessing the impact of water on the color of images acquired by device 10. Device 10 has a camera with a lens and image sensor (see, e.g., image sensor 24) for capturing images of an external underwater object such as object 74. Light-emitting devices 26 may include a white light camera flash, a supplemental red-light illumination source, and other light sources. In addition to image sensor 24 and light sources 26, device 10 may include a pressure sensor, an orientation sensor, and the other components of FIG. 1.

Figure 10:
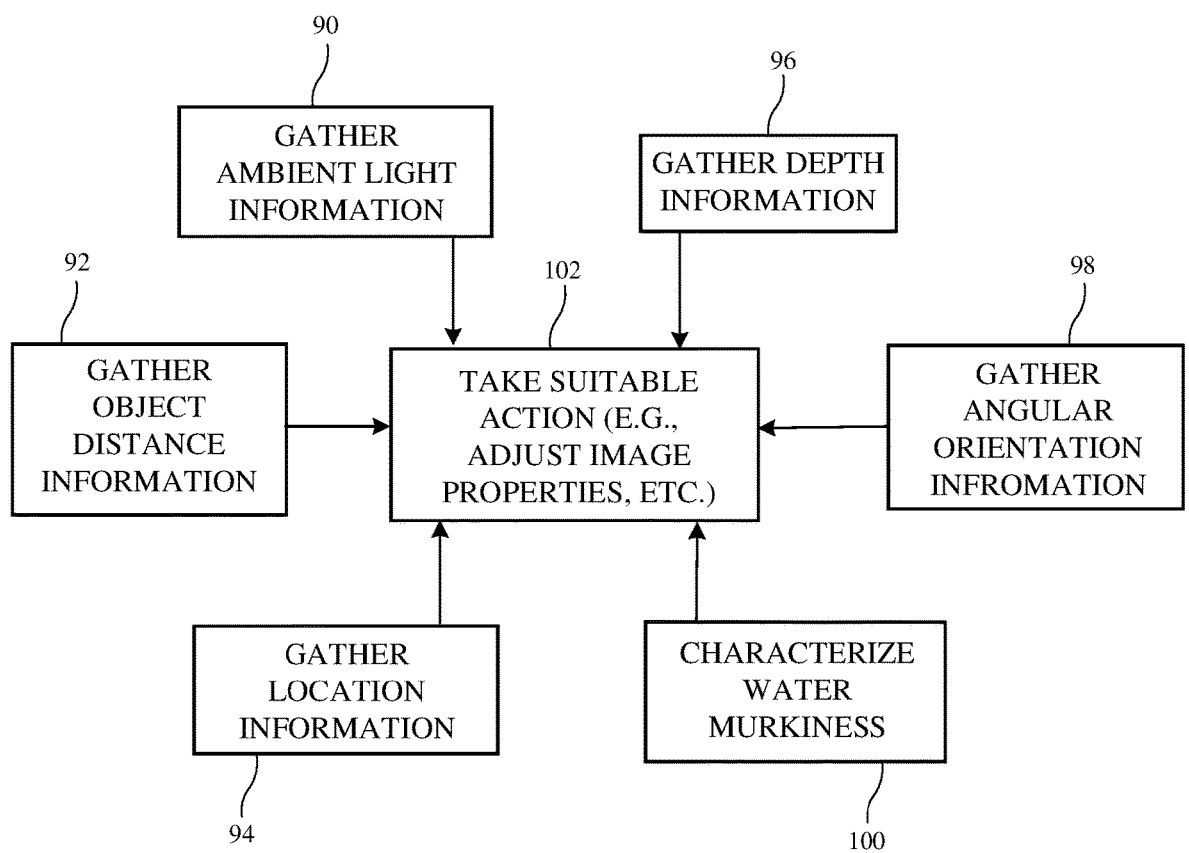

Device 10 may be tilted with respect to horizontal axis X. As shown in FIG. 10, for example, device 10 may be characterized by housing axis 66 (e.g., an axis extending through device 10 from one side of device 10 to another perpendicular to the orientation of the direction of view of image sensor 24). Water surface 72 may be characterized by surface normal n. Vertical dimension 68 may be parallel to surface normal n and the Y axis of FIG. 8. When device 10 is tilted relative to horizontal as shown in FIG. 8, axis 66 of device 10 will make a non-zero angle A with respect to vertical dimension 68 (and the direction-of-view 25 of image sensor 24 will be oriented at the same non-zero angle A with respect to horizontal dimension 67 and the X-axis. Device 10 is located at a distance D0 beneath water surface 72. Target object 74 is located a distance D1 from image sensor 24 and is located a distance D2 under water surface 72.

Ambient light travels distance D2 from water surface 72 before reaching object 74. Light reflecting from object 74 travels distance D1 before being captured by image sensor 24. Device 10 may perform color balancing operations based on the calculated distance D1 and D2. Distance D1 can be measured using a reading from the autofocus system in the camera of device 10, using time-of-flight measurements from a time-of-flight sensor (e.g., a sensor formed from a light-emitting device 26 and light sensor 18, etc.), using echolocation sensor information, using three-dimensional sensor distance information, or using other sensor data indicative of distance D1. Depth D0 can be measured using pressure sensor 32, using ambient light data to find a depth match in curves 54 of FIG. 4, using echolocation sensor measurements of the distance to water surface 72, using time-of-flight measurements to measure the distance to water surface 72, and/or using other depth measurement techniques. Distance D2 can be determined based on measure depth D0, angular orientation A, and distance D1 using the trigonometric relationship D2=D0−D1(sin(A)).

With one illustrative configuration, the light absorption spectrum of water surrounding device 10 is measured by control circuitry 16 (e.g., using color channel readings from each of the color channels in a multichannel color ambient light sensor to identify a water absorption spectrum from a look-up table or a curve fit). This light absorption spectrum can then be applied to the distance D1+D2 to determine how to adjust the color balance for images of object 74.

As described in connection with FIG. 7, above-water lighting conditions influence underwater lighting conditions. Above-water ambient light conditions can be determined by assuming that a commonly occurring lighting environment is present, by measuring ambient light conditions with a color ambient light sensor before device 10 is submerged, or by using location information (e.g., geographic location information from receiver 34 or other circuitry in device 10) to determine a geographic-location-specific ambient lighting condition (e.g., based on historical data for a particular geographic region and time, based on current weather conditions at a particular geographic region, etc.). The above-water ambient light conditions (e.g., an ambient light spectrum) can then be used in combination with the known path length distance D1+D2 and the water light absorption spectrum to determine the underwater ambient lighting conditions and to perform color adjustments on captured image data based on these underwater ambient lighting conditions.

Figure 9:
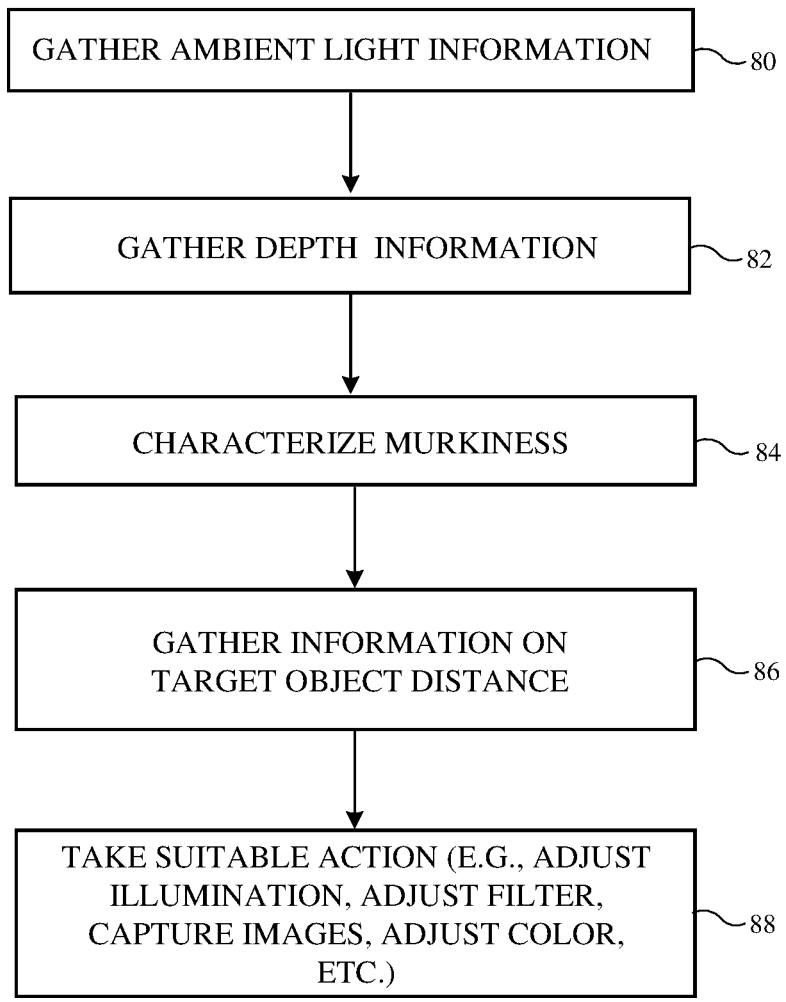
FIGS. 9 and 10 are flow charts of illustrative operations involved in gathering information associated with underwater lighting and image capture operations in accordance with an embodiment.

Illustrative operations involved in using device 10 to capture underwater images are shown in FIG. 9. FIG. 9 is an example showing how underwater images can be captured and processed using sensor information and other information. Other arrangements can be used, if desired. The arrangement of FIG. 9 is illustrative.

During the operations of block 80, device 10 may capture ambient light information. A color ambient light sensor (see, e.g., sensor 18) may be used in measuring ambient light color. A color ambient light sensor may have more channels than the number of color channels (e.g., the three colors red, green, and blue) associated with image sensor 24. This provides the color ambient light sensor with an enhanced ability to estimate the full visible (and invisible) light spectrum of ambient light. In general, the color ambient light sensor can have any suitable number of channels (e.g., at least 3 at least 4, at least 5, 6-15, 4-10, fewer than 25, or other suitable number). Ambient light conditions can be measured at one or more depths underwater (e.g., depth D0 at which device 10 is located during image capture operations and, if desired, one or more additional depths) and can optionally be measured above water.

Information on depth D0 may be measured during the operations of block 82. Depth measurements may be made using ambient light measurements and curves 54 of FIG. 4, may be measured using pressure sensor 32, and/or may be measured using other sensors (echolocation, time-of-flight, etc.).

During the operations of block 84, the murkiness of the water surrounding device 10 can be measured. For example, control circuitry 16 can use a camera flash or other light-emitting device 26 to emit light while measuring resulting backscattered light to determine the level of murkiness. If desired, murkiness can be detected before and/or after image capture operations (e.g., using a lower intensity of flash emission than during image capture flash light emission). Multiple flashes and measurements can be used starting from a lower intensity and progressing to a higher intensity in order to avoid saturating the image sensor, particularly when murkiness is high.

During the operations of block 86, control circuitry 16 can determine image-sensor-to-object distance D1 (e.g., using camera autofocus distance information, time-of-flight measurements, distance information from an echolocation sensor, distance from a three-dimensional gesture sensor, or other distance measurement circuitry).

Control circuitry 16 can take suitable actions in response to these sensor measurements and/or information from other sensors and circuitry in device 10. As an example, device 10 can capture images and can adjust color balance for the images based on the water absorption spectrum (e.g., water quality based on geographic information such as the known spectral properties of certain bodies of water, measured water absorption spectrum information, etc.) and ambient light path distance D1+D2 (e.g. a value of D2 determined using device angular orientation information A from an orientation sensor 28 and using depth measurement D0), using above-water illuminant information based on measured geographic location, time of day, weather, above water or shallow water measurements from the color ambient light sensor, etc.). Contrast adjustments to the images and/or other adjustments may, if desired, be made based on the measured murkiness of the water and/or distance D1 (e.g., using a relationship of the type illustrated by curve 56 of FIG. 5).

FIG. 10 is a generalized diagram illustrating a range of possible operations that may be used in gathering images and information for adjusting the images.

As shown in FIG. 10, device 10 may, if desired, gather information ambient light information during the operations of block 90. Ambient light information may be gathered using light sensors 18 (e.g., an ambient light sensor that measures ambient light intensity and color, an ambient light sensor that makes color intensity measurements in multiple bands to help estimate an ambient light spectrum, etc.).

Underwater depth information (distance D0) may be measured during the operations of block 96. During these operations, device 10 may use pressure sensor 32 to measure water pressure to determine depth D0, may use an ambient light data measured using a color ambient light sensor in combination with a table of underwater Planckian loci (curves 54 of FIG. 4) to ascertain depth D0, and/or may obtain depth information from other sensors and/or manually entered depth information.

Object distance information (distance D1 of FIG. 8) may be gathered during the operations of block 92 (e.g., this information may be gathered from an autofocus system, from a time-of-flight sensor, from an echolocation sensor, from a three-dimensional sensor, or from other distance measurement circuitry).

The tilt of device 10 (e.g., the angular orientation of device 10) may be measured using an accelerometer or other orientation sensors during the operations of block 98.

During the operations of block 100, device 10 may emit light and measure reflected light to characterize the amount of murkiness present in the water surrounding device 10 and/or may otherwise measure water murkiness.

During the operations of block 94, information on the location of device 10 may be gathered. Water quality (light scattering, impurities, light absorption spectral characteristics, etc.) may vary between bodies of water in different geographic locations (e.g., different parts of the world). Device 10 may, if desired, maintain information on water characteristics for different locations (e.g., different regions of various oceans, lakes, rivers, etc.) and can use geographic location information gathered during the operations of block 94 and/or other information in determining the optical properties of the water surrounding device 10. This information on the properties of the water surrounding device 10 may be used by device 10 in addition to and/or instead of using measured water properties to determine the optical characteristics of the water surrounding device 10.

During the operations of block 102, device 10 can take any suitable action based on the gathered information. As an example, color balance and/or contrast in still and/or video images can be adjusted (e.g., based on depth, based on object distance, based on water absorption spectrum, based on above-water ambient light spectrum, based on underwater ambient light spectrum, based on angular orientation, based on water murkiness, etc.). If desired, an automatic white balance process may be implemented using the information gathered during the operations of FIG. 10 and/or based on other information. Images can be adjusted post capture or can be adjusted pre-capture (e.g., by adjusting camera settings before or during image capture operations). In scenarios in which device 10 includes a supplemental illumination system (e.g., a light source such as a red light-emitting diode or other red light source), control circuitry 16 can direct the red light source to produce red illumination for the object being imaged in response to detecting that device 10 is underwater and/or in response to detecting that greenish underwater ambient lighting conditions are present. The red illumination may help compensate for the greenish tone of the underwater ambient lighting. In addition to using red illumination or instead of using red illumination, an electrically adjustable camera filter (e.g., a liquid crystal filter or other suitable filter) may, if desired, be placed in a red state in response to detecting that device 10 is underwater to help compensate for the greenish hue of underwater ambient light. When device 10 is above water, the filter can be placed in a clear state.

The foregoing is merely illustrative and various modifications can be made to the described embodiments. The foregoing embodiments may be implemented individually or in any combination.

What is claimed is:

1. A submersible electronic device configured to operate under water, comprising:
   an ambient light sensor having photodetectors configured to measure a wavelength of light under water to determine underwater ambient light information including an intensity and a color of the water;
   an image sensor separate from the ambient light sensor, wherein the image sensor is configured to capture an image; and
   control circuitry configured to:
   determine an underwater depth of the image sensor;
   use the measured intensity and color of the water to determine a light absorption spectrum for the water; and
   adjust color balance for the image based at least partly on the underwater depth and the light absorption spectrum for the water.

2. The submersible electronic device defined in claim 1 wherein the image sensor has a first number of color channels, wherein the ambient light sensor has a second number of color channels, and wherein the second number of color channels is greater than the first number of color channels.

3. The submersible electronic device defined in claim 1 further comprising an orientation sensor configured to measure an angular orientation of the electronic device, wherein the control circuitry is configured to adjust the color balance based at least partly on the measured angular orientation.

4. The submersible electronic device defined in claim 3 wherein the image sensor is configured to capture the image of an underwater object, wherein the control circuitry is configured to determine a path length associated with a sum of: (i) a depth of the underwater object below a water surface of the water and (ii) a distance separating the image sensor from the underwater object.

5. The submersible electronic device defined in claim 4 wherein the control circuitry is configured to determine the underwater depth of the underwater object below the water surface at least partly using the measured angular orientation.

6. The submersible electronic device defined in claim 5 wherein the control circuitry is configured to determine the underwater depth of the underwater object based at least partly on a measured depth of the image sensor below the water surface.

7. The submersible electronic device defined in claim 6 further comprising a pressure sensor, wherein the control circuitry is configured to obtain the measured depth of the image sensor using the pressure sensor.

8. The submersible electronic device defined in claim 6 wherein the control circuitry is configured to maintain information on underwater Planckian loci at multiple respective depths and wherein the control circuitry is configured to obtain the measured depth of the image sensor using the underwater Planckian loci and the underwater ambient light information.

9. The submersible electronic device defined in claim 1 further comprising:
a light source; and
a light detector, wherein the control circuitry is configured to measure water murkiness using the light source and light detector.

10. The submersible electronic device defined in claim 9 wherein the control circuitry is configured to adjust contrast for the image based on the measured water murkiness.

11. The submersible electronic device defined in claim 9 wherein the image sensor is configured to capture the image of an underwater object, wherein the control circuitry is configured to determine a distance between the underwater object and the image sensor, and wherein the control circuitry is configured to adjust contrast for the image based on the distance.

12. The submersible electronic device defined in claim 1 wherein the image sensor is configured to capture the image of an underwater object, wherein the image sensor has an associated autofocus system configured to focus on the underwater object, and wherein the control circuitry is configured to gather information on a distance between the underwater object and the image sensor from the autofocus system.

13. The submersible electronic device defined in claim 1 wherein the image sensor is configured to capture the image of an underwater object, wherein the submersible electronic device comprises a distance sensor selected from the group consisting of: a time-of-flight sensor, an echolocation sensor, and a three-dimensional sensor, and wherein the control circuitry is configured to gather information on a distance between the underwater object and the image sensor from the distance sensor.

14. The submersible electronic device defined in claim 1 wherein:
the ambient light sensor comprises a color ambient light sensor and is configured to gather above-water ambient light information; and
the control circuitry is configured to adjust the color balance for the image based at least partly on the above-water ambient light information.

15. A waterproof cellular telephone, comprising:
an image sensor configured to capture an image of an underwater object;
a color ambient light sensor configured to gather underwater ambient light information and above-water ambient light information;
a pressure sensor; and
control circuitry configured to adjust color balance for the image based at least partly on the underwater ambient light information, the above-water ambient light information, and information from the pressure sensor.

16. The waterproof cellular telephone defined in claim 15 wherein the image sensor has a first number of color channels, wherein the color ambient light sensor has a second number of color channels, and wherein the second number of color channels is greater than the first number of color channels.

17. The waterproof cellular telephone defined in claim 15 further comprising an orientation sensor configured to measure an angular orientation of the cellular telephone, wherein the control circuitry is configured to adjust the color balance based at least partly on the measured angular orientation.

18. The waterproof cellular telephone defined in claim 15 further comprising:
a light source; and
a light detector, wherein the control circuitry is configured to measure water murkiness using the light source and light detector.

19. The waterproof cellular telephone defined in claim 18 wherein the control circuitry is configured to adjust contrast for the image based on the measured water murkiness.

* * * * *